United States Patent [19]
Newton

[11] Patent Number: 4,715,393
[45] Date of Patent: Dec. 29, 1987

[54] FLUID DISPERSING CHECKVALVE

[76] Inventor: Gary D. Newton, 19473 County Rd. 35, Eckley, Colo. 80727

[21] Appl. No.: 887,886

[22] Filed: Jul. 18, 1986

[51] Int. Cl.⁴ .................................. F16K 19/00
[52] U.S. Cl. ............................ 137/7; 137/538; 137/605; 137/896; 239/562; 239/568; 239/571; 366/167
[58] Field of Search ............... 137/538, 605, 896, 7; 239/562, 568, 570, 571; 366/167

[56] References Cited

U.S. PATENT DOCUMENTS

| | | | |
|---|---|---|---|
| 860,820 | 7/1907 | Norton | 137/538 |
| 1,111,993 | 9/1914 | Carder . | |
| 1,153,401 | 9/1915 | Milne | 239/562 X |
| 1,693,355 | 11/1928 | Thompson | 137/538 X |
| 2,429,578 | 10/1947 | Gleasman | 137/538 |
| 2,470,372 | 5/1949 | Roth | 137/539.5 |
| 2,816,812 | 12/1957 | Peck | 137/505.42 X |
| 3,464,626 | 9/1969 | Stamps | 239/10 |
| 3,656,694 | 4/1972 | Kirschke | 239/562 X |
| 3,693,656 | 9/1972 | Sauer | 137/896 X |
| 4,549,813 | 10/1985 | Volz | 366/167 |

FOREIGN PATENT DOCUMENTS

| | | |
|---|---|---|
| 143693 | 1/1950 | Australia . |
| 165313 | 4/1954 | Australia . |
| 206604 | 10/1955 | Australia . |
| 72149 | 6/1943 | Czechoslovakia ........... 137/605 |
| 770308 | 1/1889 | Switzerland . |

Primary Examiner—Robert G. Nilson
Attorney, Agent, or Firm—Sheridan, Ross & McIntosh

[57] ABSTRACT

A checkvalve is provided for dispersing a fluid into a flowing stream. All operating parts of the checkvalve are located in the flowing stream to provide uniform and rapid dispersion of the fluid.

10 Claims, 3 Drawing Figures

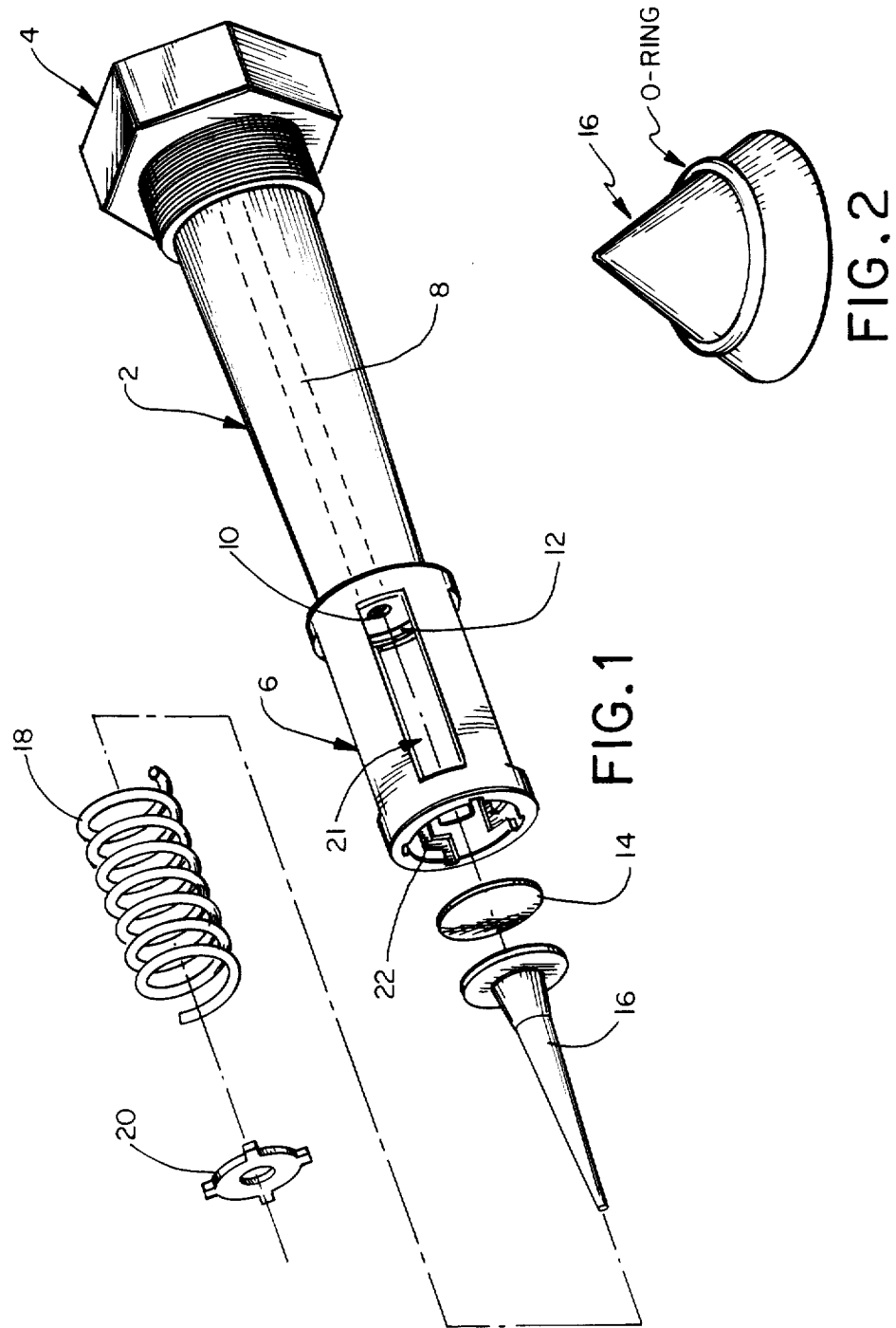

FLUID DISPERSING CHECKVALVE

FIELD OF THE INVENTION

This invention relates to a checkvalve for dispersing a fluid into a flowing stream. More particularly this invention relates to a checkvalve useful in dispersing agricultural chemicals into a stream of irrigation water.

BACKGROUND OF THE INVENTION

In recent years a method for adding agricultural chemicals to farmland has developed. This method commonly known as "chemigation" involves the introduction of the agricultural chemicals into irrigation water with subsequent dispersion of the irrigation water containing the chemicals onto the cropland. Chemicals such as fertilizers, insecticides, herbicides, etc. can be dispersed by this method. In order to be effective, the chemical must be well dispersed in the irrigation water prior to the water being sprayed upon the cropland. Care must be taken in order to assure that in the event of a shutdown in the flow of irrigation water the chemical will not flow into the water source causing contamination of the source of water. Also, it is necessary that irrigation water does not flow into the chemical supply system causing overflow and area contamination.

Although some agricultural chemicals are soluble in water, it is also desirable to effectively disperse chemicals which are not readily soluble or are insoluble in water. These chemicals are often supplied dissolved in a water insoluble solvent such as kerosene. Certain chemicals such as fertilizers can also be available as a slurry of solids in a liquid. Therefore, it is desirable to effectively disperse a water insoluble (or minimally soluble) material into a stream of irrigation water.

A number of valve systems have been suggested in the prior art. Savage in U.S. Pat. No. 3,267,959 (1966) discloses a valve which is said to function as an antifouling and anti-siphoning valve in irrigation systems. The valve is provided with a neck portion which is designed to extend into the liquid stream being treated so that the chemicals being discharged will be "immediately absorbed by the liquid and removed from the positio of the valve proper." The valve is designed to open when the chamical being injected is subjected to a pressure equal to or greater than the sum of the pressure of the fluid flowing in the pipe into which the valve extends. An array of slots is provided in the tip portion so that when the chemical flows past the O-ring seal, the chemical can disperse through the slots thereby providing an early release of discharge pressure to avoid dislodging the O-ring seal. This valve has a significant disadvantage in that, when the flow rate of the chemical is increased and the valve member containing the O-ring travels past the end of the housing containing the slots, the valve stem can be subjected to a significant lateral force as the result of the flow of the liquid stream past the valve. This lateral force can bend the valve stem resulting in failure of the O-ring valve to seat properly. Deflection of the extended valve stem can also result in the valve jammping open. Either effect will allow the chemical to continue to leak into the system or allow liquid in the conduit to pass through the checkvalve back to the source of the chemical.

Gilroy in U.S. Pat. No. 4,437,611 (1984) discloses a spray nozzle to be used in a sprinkler system in a corrosive or dirty environment. The spray nozzle is designed to be mounted in a conduit wall essentially flush with the inside of the conduit into which a spray of liquid is to be provided. This nozzle has a disadvantage that the moving parts are continually bathed in the checmial being injected. Since many of the chemicals used in agriculture are corrosive, special materials must be used to avoid corrosion and plugging of the valve. Additionally, introduction of the chemical along the conduit wall does not provide for optimum dispersion of the chemical into the flowing stream.

In a series of three patents, Stamps et al. disclose a method and apparatus for dispersing substantially water soluble agricultural chemicals into an irrigation system. This method involves dispersing the chemical by passing a pressurized stream containing the chemical through an orifice. The dispersed stream passes through a checkvalve and subsequently through an entry line which projects into the water stream. This procedure has the disadvantage of requiring a substantial amount of additional equipment in order to effectively disperse the chemical into a stream which must then be dispersed into the main irrigation stream. U.S. Pat. Nos. 3,464,626 (1969), 3,326,232 (1967), and 3,375,976 (1968).

None of these references disclose a device capable of effectively dispersing a fluid at a variety of flow rates itno a moving stream of liquid. All of these referenced devices and methods have the disadvantages disclosed hereinabove. Accordingly, there is a need for an apparatus which can effectively disperse a fluid into a stream of a liquid while also serving as a checkvalve to avoid unintentional flow of the fluid into the liquid or the liquid back into the source of the fluid.

SUMMARY OF THE INVENTION

It has been found that the above described disadvantages can be overcome with the checkvalve of the instant invention. The instant fluid dispersing checkvalve comprises a conduit having a passage extending longitudinally therethrough. The passage has an inlet end and an outlet end, and an orifice is located at the outlet end of the passage. A slotted housing which has a first end is attached to the outlet end of the conduit. A valve seat circumscribes the orifice. A valve which is adapted to reside in said valve seat is slidably located in the housing. A valve retainer is also slidably mounted in the housing to urge the valve into contact with the valve seat. A spring means is located in the housing and is operatively connected to the valve retainer to yeildingly urge the retainer into contact with the valve to provide a seal when the valve resides in the valve seat. The spring means is held in place in the housing by a spring retainer which is affixed to the second end of the housing and engages the spring means.

In another embodiment, the instant invention comprises a method for dispersing a fluid into a liquid stream. The fluid flows through a passage in a conduit and exits through an orifice. The exiting fluid displaces a valve from a valve seat which surrounds the orifice. The valve is urged against a valve retainer moving the valve retainer and valve longitudinally in a slotted housing away from the orifice. The valve retainer is moved in opposition to a spring means compressing the spring means. The exiting fluid flows past the valve and is dispersed through slots in the slotted housing into the liquid stream. Upon termination of the flow of fluid, the compressed spring means acts to return the valve retainer and valve to provide contact between the valve and the valve seat and seal the orifice.

BRIEF DESCRIPTION OF THE DRAWING

FIG. 1 shows an exploded view of the device of the instant invention;

FIG. 2 shows another embodiment of the valve and valve retainer; and

DESCRIPTION OF THE PREFERRED EMBODIMENTS

Figure 3:
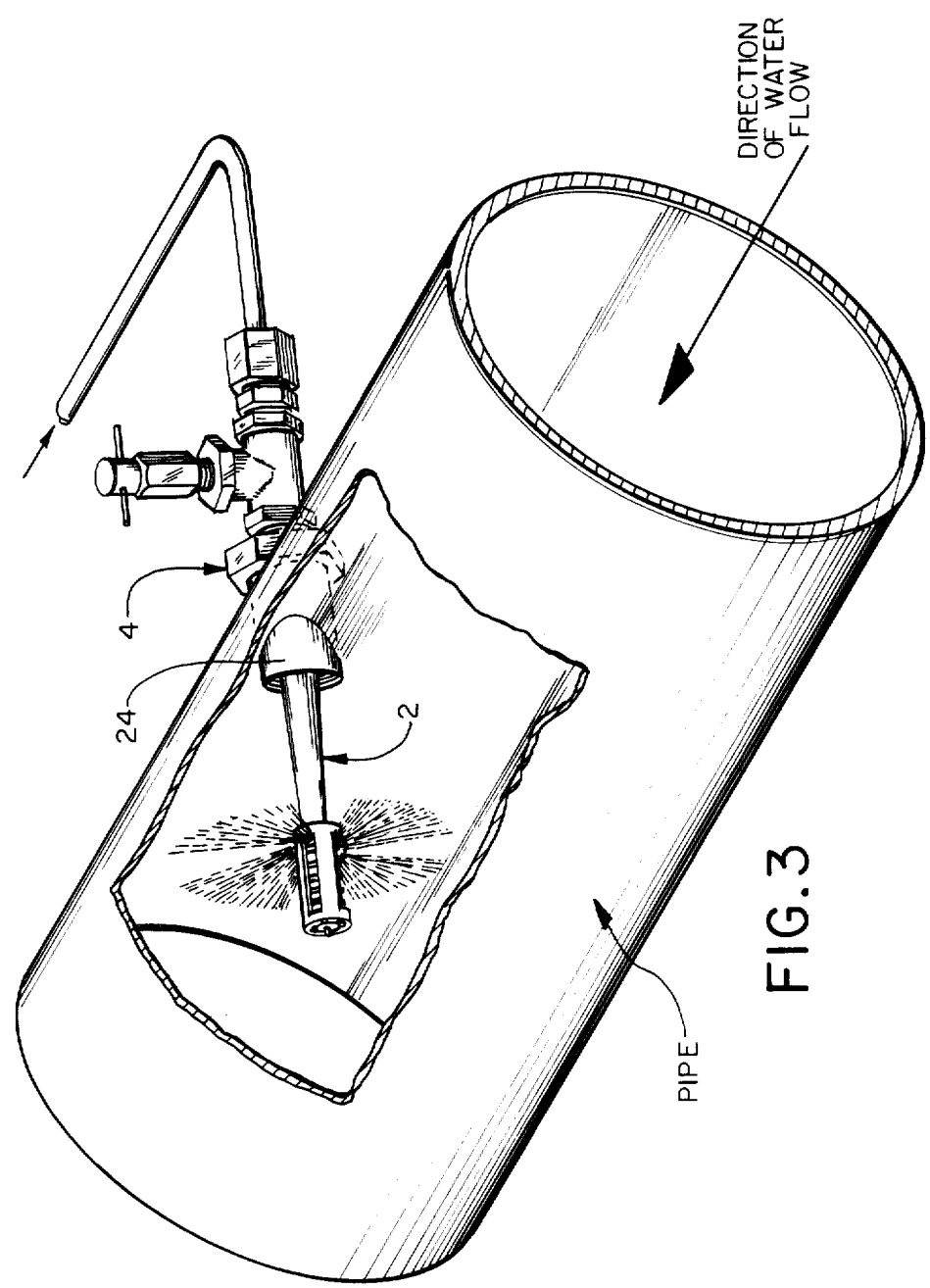
FIG. 3 represents the operation of another embodiment of the instant invention in which the valve is inserted into the steam at an angle of less than 90° to the internal pipe surface.

Referring now to FIG. 1, a preferred embodiment of the instant checkvalve is depicted in exploded form. Conduit 2 is shown having a fitting 4 on one end and a housing 6 on the other. A passage 8 passes longitudinally through the conduit 2 and terminates in a orifice 10 at the outlet end of the conduit. Surrounding the orifice is a valve seat 12. A valve 14 is urged against the valve seat 12 by a valve retainer 16 and spring means 18. The spring means is retained in the housing 6 by a spring retainer means 20. The valve, valve retainer and spring means are all slidably contained within said housing 6.

In order to provide the desired rapid dispersion of the fluid into a flowing stream, it is preferred that the conduit 2 be of such a length as to locate the housing 6 in approximately the center of teh flowing stream. Locating the housing in the liquid stream allows liquid to flow around the moving parts of the checkvalve, i.e. the valve, valve retainer and spring means, as well as the valve seat and orifice. The flowing liquid stream serves to rapidly remove the chemical from these parts and prevent accumulation of the chemical which can cause jamming or freezing of the checkvalve. Although conduit 2 is depicted as being straight in FIG. 1, it can be formed to have an angle of up to about 90° compared to the straight embodiment.

The housing 6 contains valve 14, valve retainer 16 and spring means 18. The interior of the housing acts as a channel in which these parts move. Although it is preferred that the housing be substantially cylindrical in shape, other configurations are contemplated as functioning equivalently. For example, housings having the lateral cross-section of a square, rectangle, ellipse, etc. function satisfactorily and are therefore considered to be within the scope of the instant invention.

In making the valve, it is preferred that the housing and conduit be molded as one piece. The housing 6 can be affixed to conduit 2 by any appropriate means. For example, the housing can be glued, screwed or welded onto said conduit depending on the materials of construction.

The housing 6 is provided with a plurality of openings or slots 21. These openings in the housing allow the fluid passing from the orifice to rapidly disperse in the stream. The term "slot" as used herein contemplates a variety of equivalent configurations which can accomplish this dispersion. For example, holes, squares, rectangles, spiral openings, etc., can be used. It is preferred that the slots occupy as much of the surface area of the housing as possible in order to allow thorough dispersion of the fluid into the stream. However, it is also necessary that there be sufficient surface on the housing to have the required strength to retain the spring and valve within. Also, it is necessary that there be sufficient surface area to provide a guiding path for movement of the valve 14 and valve retainer 16 within the housing.

As discussed previously, the housing 6 provides a channel for movement of the valve and valve retainer as they are acted upon by the pressure of the fluid and the tension of the spring means 18. It is preferred that the valve 14 and valve retainer 16 have minimal lateral movement within the housing to avoid binding and jamming with subsequent loss of function of the checkvalve. Therefore, in the embodiment shown in FIG. 1, it is preferred that the outside edges of the valve contact the inside surface of the housing. The valve retainer must freely move longitudinally within the housing, but should be sized to minimize lateral movement.

The valve 14 should seal against the sides of the slotted housing 6 in order to maintain the most efficient mixing of the fluid. To maintain maximum mixing efficiency it is preferred that the valve be of solid construction, i.e. not contain an aperture such as an O-ring in order to avoid "riding" of the valve when a valve retainer as depicted in FIG. 1 is used. As discussed hereinbelow, an O-ring can be used with a different valve retainer configuration. The valve must be capable of effectively sealing to prevent movement of the fluid from the orifice when the valve is in contact with the valve seat. It must also have sufficient structural integrity to avoid distortion as the result of fluid or stream pressure. Preferable materials of construction include viton, neoprene, Buna-N rubber and teflon. It has been found that a thickness of at least about ⅛th of an inch is sufficient to minimize the pressure distortion problems and provide an adequate seal.

The valve retainer 16 contacts the valve 14 at the urging of spring means 18 and forces the valve 14 into intimate contact with valve seat 12. A preferred configurations of the valve retainer is shown in FIG. 1. When a solid valve is used, it is preferred that the valve retainer have a flat surface for contacting the valve. Preferably, the valve retainer also conveniently has an elongated member which the spring means 18 fits around. This serves to keep the spring means centered on the valve retainer to provide even pressure on the valve 14. Alternatively, the spring means can be attached to the valve retainer and the elongated member eliminated.

It is possible to use O-ring type valves provided they are attached to the valve retainer 16 to avoid the "riding" of the valve discussed hereinabove. One such embodiment, depicted in FIG. 2 (elongated member not shown), is a conical shaped valve retainer adapted to contact a female conically shaped valve seat. An O-ring valve can be provided around the perimeter of the valve retainer to seal the flow of fluid when the valve contacts the valve seat. It is also contemplated that the surface of the valve retainer can be grooved in order to provide a better dispersion of the fluid.

Referring again to FIG. 1, the spring means 18 urges the valve retainer 16 to maintain the valve 14 in intimate, sealing contact with the valve seat 12. This prevents any significant flow of fluid out of the orifice 10 or any of the stream from flowing into the passage 8. The tension of the spring means 18 is selected to provide a pressure sufficient to cause valve 14 to seal when fluid is not being pumped through passage 8. Although the spring means 18 can exert a pressure less than the stream, it is preferred that the spring means have a tension of at least 2 pounds per square inch greater than the stream pressure in order to conveniently calibrate the delivery rate of the pump means being used to deliver fluid through passage 8. More preferably, the tension is at least 5 pounds per square inch greater, e.g. if the stream has a pressure of 50 psig, it is preferred that the spring means have a tension which will exert at least about 55 psig. Ordinarily, if it is desired that smaller fluid droplets be formed, the differential between the pressure exerted by the spring means and the stream pressure should be greater, i.e. the tension of the spring means should be greater than the stream pressure.

The spring retainer means 20 holds the spring means in place in the housing. The spring retainer means is affixed to the end of the housing opposite the orifice. The spring retainer means can be affixed by being inserted into locking channels 22 such as shown in FIG. 1 although other channel configurations can be used; it can be screwed onto the end of the housing; it can be compression fitted or thermally welded; or it can be attached by any other suitable method. A preferred method is shown in FIG. 1 since this allows easy removal and replacement of the spring means and/or valve 14.

The valve of the instant invention can readily disperse a fluid flow as low as 0.1 gallon per hour up to a flow rate as high as about 130 gallons per hour. For flow rates in the range of about 0.1 to about 35 gallons per hour, an orifice in the range of about 0.125 inch can be used to provide satisfactory results. For flow rates in the range of aboug 35 to about 130 gallons per hour an orifice in the range of about 0.250 inch is preferably used.

The instant checkvalve can be constructed from any materials having the suitable chemical resistance and strength. The design of the instant checkvalve allows the use of lower strength and less resistant materials for constructing the spring means, valve retainer and housing than prior art valves. In the instant checkvalve, the moving stream of liquid constantly washes these parts free of any corrosive chemical. Also, the valve retainer is not subjected to severe lateral forces as in the Savage valve. Thermoplastic resins can be used in construction of the conduit 2, fitting 4, housing 6, valve retainer 16 and spring retainer means 20. It is preferred that reinforced resins be used in order to provide additional strength, for example, glass reinforced polyolefins, polyesters and polyamides can be used. It is preferred that the conduit 2, fitting 4, and housing 6 be prepared in one pice preferably by injection molding. Since the spring means is located in the flowing stream instead of residing in the chemical fluid, the material of construction does not have to be of a special non-corrosive material as it does in prior art devices. However, for longer lifetime, the preferred materials of construction include stainless steel, Hastelloy alloys, etc.

Although the instant checkvalve has preferred utility in adding agricultural chemicals to a stream of irrigation water, the checkvalve can also be used to introduce and disperse essentially any fluid into a moving liquid stream. Accordingly, it is not intended that this invention be limited to the chemigation field. For convenience of explanation, the instant checkvalve is discussed in terms of the addition of agricultural chemicals to a stream of irrigation water. However, it is expected that other uses can be readily determined which involve the addition of a fluid to a moving stream of liquid. The instant checkvalve has the advantage of providing significant dispersion of a fluid in a stream which does not have turbulent flow.

As used herein the term "fluid" refers to liquid including emulsions, gases and slurries of finely divided particulates suspended in a liquid. In order to be used in the instant checkvalve, the particulates in such a slurry must be small enough to readily pass through the orifice. Ordinarily the largest particulate in such a slurry should be less than about one-tenth the diameter of the orifice.

In an agricultural operation, the valve is inserted into an opening in an irrigation pipe through which the stream of irrigation water is passed. A preferred method of attaching the valve is to provide a threaded connector 24 in the side of the pipe as shown in FIG. 3. A threaded fitting 4 on one end of the conduit 2 can be used to attach the valve to the pipe. The connector 24 can be affixed to the pipe in any convenient manner, ordinarily by welding. It can be attached squarely on the pipe, i.e. at 90° or can be angled as shown in FIG. 3. Thus the checkvalve can be inserted into the pipe so that conduit 2 is straight (i.e. 90°) or at an angle between about 0° and about 45° compared to the longitudinal axis of the pipe. Having the conduit 2 at an angle of less than 90° to the longitudinal axis of the pipe provides better dispersion of the chemical into the flowing stream. This can be accomplished by using an angled conduit 2 as discussed hereinabove, or by affixing connector 24 at an angle, or a combination of the two.

Before the pressure on the chemical fluid is increased, the spring means 18 urges the valve retainer 16 against valve 14 to seal orifice 10 and prevent any of the water or irrigation stream from passing into passage 8 or any of the chemical in passage 8 from escaping into the water stream. As the pressure of the chemical fluid is increased, it will eventually equal the greater of the pressure provided by the spring means 18 or the irrigation stream. At this point, chemical fluid can escape past the valve 14 into the irrigation stream. Since the pressure of the chemical fluid is greater than the pressure of the stream, no water flows from the stream into passage 8. As the chemical passes through orifice 10 and past valve 14, it is rapidly dispersed in the irrigation stream through slots 21. The difference in pressure between the chemical fluid and the irrigation stream serves to break the fluid into small particles which are rapidly dispersed in the stream. As the pressure on the chemical is increased, the spring means 18 is further compressed and a greater volume of chemical passes through the orifice 10 and into the irrigation stream. In the event the flow of chemical is terminated, the pressure on valve 14 from the chemical is terminated and spring means 18 immediately acts to force valve 14 against valve seat 12 sealing the orifice and preventing the passage of material from the irrigation stream into passage 8.

A variety of agricultural chemicals such as fertilizers, pesticides, fungicides, insecticides, and herbicides can be dispersed into a stream of irrigation water using the instant checkvalve. The chemicals can be in the form of solutions, emulsions, suspensions or colloids.

It will be understood that the above description of the present invention is susceptible to various modifications, changes and adaptations and the same are intended to be comprehended within the meaning and range of equivalents of the appended claims.

What is claimed is:

1. A checkvalve for dispersing a fluid into a stream of liquid said checkvalve comprising:

(a) a conduit having a passage extending longitudinally therethrough, said passage providing an inlet end and an outlet end to said conduit;

(b) an orifice located at the outlet end of said passage;

(d) a housing having a first end fixed to the outlet end of said conduit said housing having a plurality of slots extending substantially the length of said housing to allow a portion of the liquid flowing past said housing to (d) a valve seat within said housing circumscribing said orifice;

(e) a valve slidably mounted in said housing and adapted to reside in said valve seat;

(f) a valve retainer slidably mounted in said housing and adapted to urge said valve against said valve seat;

(g) a spring means in said housing operatively connected to said valve retainer to yieldingly urge said retainer into contact with said valve to provide a seal when said valve resides in said valve seat; and (h) a spring retainer means mounted on the second end of said housing engaging said spring means and retainer said spring means in said housing.

2. The checkvalve of claim 1 wherein said valve is a solid disk.

3. The checkvalve of claim 1 wherein said valve retainer has a conical shape and said valve is an O-ring mounted on said conical-shaped valve retainer.

4. The checkvalve of claim 3 wherein said valve retainer has a grooved surface.

5. The checkvalve of claim 1 wherein a threaded fitting is attached to the inlet end of said conduit.

6. The checkvalve of claim 1 wherein the outside edges of said valve are in slideable contact with the inside surface of said housing.

7. The checkvavle of claim 1 wherein said orifice has a diameter of between about 0.125 inch and about 0.25 inch.

8. A method for dispersing a fluid in a liquid stream which comprises:

(a) flowing said fluid through a passage in a conduit;

(b) exiting said fluid from said passage through an orifice;

(c) displacing a valve from a valve seat circumscribing said orifice with said flow of fluid;

(d) urging said valve against a valve retainer to move said valve retainer longitudinally in a slotted housing in opposition to a spring means compressing said spring means; and (e) passing said fluid past said valve and through slots in said slotted housing and dispersing said fluid into said stream flowing past and through said slotted housing.

9. The method of claim 8 wherein said liquid stream comprises irrigation water and said fluid comprises an agricultural chemical selected from the group consisting of herbicides, pesticides and fertilizers.

10. The method of claim 8 wherein upon termination of the flow of said fluid the spring means acts to return said valve retainer and valve longitudinally in said slotted housing and urge said valve against said valve seat to seal said orifice.

* * * * *

UNITED STATES PATENT AND TRADEMARK OFFICE
CERTIFICATE OF CORRECTION

PATENT NO. : 4,715,393

DATED : December 29, 1987

INVENTOR(S) : Gary D. Newton

It is certified that error appears in the above—identified patent and that said Letters Patent is hereby corrected as shown below:

Column 1, line 44, delete "positio" and insert -- position -- herefor.

Column 1, line 45, delete "chamical" and insert -- chemical -- therefor.

Column 2, line 3, delete "checmial" and insert -- chemical -- therefor.

Column 4, line 36, delete "urations" and insert --uration -- therefor.

Column 6, line 1, delete "liquid" and insert -- liquids -- therefor.

Column 7, Claim 1, line 5, delete "(d)" and insert -- (c) -- therefor.

Column 7, Claim 1, line 10, insert after the word "to" -- flow through said housing; --

Column 7, Claim 1, line 25, delete "retainer" and insert -- retaining -- therefor.

UNITED STATES PATENT AND TRADEMARK OFFICE
CERTIFICATE OF CORRECTION

PATENT NO. : 4,715,393

DATED : December 29, 1987

INVENTOR(S) : Gary D. Newton

It is certified that error appears in the above-identified patent and that said Letters Patent is hereby corrected as shown below:

Column 8, Claim 7, line 6, delete "checkvavle" and insert -- checkvalve -- therefor.

Signed and Sealed this

Fourteenth Day of June, 1988

Attest:

DONALD J. QUIGG

Attesting Officer

Commissioner of Patents and Trademarks